United States Patent
Lee

(10) Patent No.: US 7,106,842 B2
(45) Date of Patent: Sep. 12, 2006

(54) METHOD OF DETECTING CUT-OFF CALLS IN A SWITCHING SYSTEM

(75) Inventor: Sang Yup Lee, Koyang-shi (KR)

(73) Assignee: LG Electronics Inc., Seoul (KR)

( * ) Notice: Subject to any disclaimer, the term of this patent is extended or adjusted under 35 U.S.C. 154(b) by 472 days.

(21) Appl. No.: 10/247,296

(22) Filed: Sep. 20, 2002

(65) Prior Publication Data

US 2003/0059013 A1    Mar. 27, 2003

(30) Foreign Application Priority Data

Sep. 27, 2001 (KR) .............................. 2001-60034

(51) Int. Cl.
*H04M 15/00* (2006.01)
(52) U.S. Cl. .............. 379/133; 379/350; 370/522
(58) Field of Classification Search ........... 379/165, 379/164, 207.04, 207.07, 257, 1.01, 9, 15.01, 379/29.09, 32.02, 32.05, 137–139, 350, 377, 379/383; 370/310, 328, 351, 357, 360, 350, 370/383–384

See application file for complete search history.

(56) References Cited

U.S. PATENT DOCUMENTS

| | | | | |
|---|---|---|---|---|
| 4,280,217 A | * | 7/1981 | Hafer et al. ............... | 370/371 |
| 5,450,485 A | * | 9/1995 | Hamilton ................... | 379/377 |
| 5,995,494 A | * | 11/1999 | Horikawa ................... | 370/310 |
| 6,549,546 B1 | * | 4/2003 | Park ........................... | 370/522 |

FOREIGN PATENT DOCUMENTS

| KR | 2001037046 | * | 5/2001 |
|---|---|---|---|
| KR | 2001045609 A | * | 6/2001 |

* cited by examiner

*Primary Examiner*—Binh K. Tieu
(74) *Attorney, Agent, or Firm*—Fleshner & Kim, LLP.

(57) ABSTRACT

A system and method for detecting cut-off of calls in a switching system records data corresponding to connection of a call in a first memory, records the call connection data in a second memory, and then at a later time and, for example, in response to a call release request compares the data in the two memories corresponding to the call. If the data does match, it is determined that the call has been cut-off. The first memory may be located in a switching unit and the second memory may be located in a processor which controls the switching unit. The switching unit may be a time switch or a space switch. Once a call cut-off is detected, the processor transmits information notifying an operator of the cut-off. The system and method represents an improvement over existing systems in terms of increased reliability and ease of repair and maintenance of system components.

27 Claims, 5 Drawing Sheets

METHOD OF DETECTING CUT-OFF CALLS IN A SWITCHING SYSTEM

BACKGROUND OF THE INVENTION

1. Field of the Invention

The present invention relates to a method of detecting cut-off calls in a switching system, and more particularly to a method of detecting cut-off calls occurring in a switching system by using a control memory.

2. Background of the Related Art

Generally, a switching system must use a switching device in order to connect or disconnect a call. Switching devices may be classified as one of two types: (a) time switch that exchanges two time slots on the same data stream and (b) space switch that exchanges the same time slots on different data streams.

A component that causes a switching device to be connected or disconnected is a control memory provided in the switching device. If data needed for call connection and release are recorded in the control memory within the switching device, the connection of the switching device may be established or released.

FIG. 1 illustrates the structure of a processor for controlling a time switch in the related art, wherein a Subscriber Service Device Processor (SSDP) (20) handles a control memory (15) in order to connect or disconnect a time switch (10).

FIG. 2 illustrates the structure of a processor controlling a space switch in the related art, wherein a Switch Network Device Processor (SNDP) (50) handles a control memory (45) in order to connect or disconnect a space switch (40).

A Code Division Multiple Access (CDMA)-2000 system, including both the time switch (10) and the space switch (40), comprises SSDP (20) that connects or disconnects the time switch (10) by handling the control memory (15) provided in the time switch (10) and SNDP (50) that connects or disconnects the space switch (40) by handling the control memory (45) provided in the space switch (40).

Further, an International Mobile Telecommunication (IMT)-2000 which includes a time switch for connection with a Public Switched Telephone Network (PSTN) or an Integrated Services Digital Network (ISDN), comprises SSDP (20) that connects or disconnects the time switch (10) by handling the control memory (15) provided in the time switch (10).

While a call is connected using the control memory, a cut-off of the call may occur as a result of a sudden disconnection of the call. A call cut-off may also occur at various parts of a switching system, but mostly it occurs at switching devices such as a time switch and a space switch.

FIG. 3 is a flow chart illustrating the process of connecting or disconnecting a call in a switching system of the related art. If a call connection is requested, SSDP (20) or SNDP (50), searches for an idle area of the control memory (15 or 45) provided in the switch and formats the data needed for call connection in a form which is appropriate for recording in the control memory (15 or 45) of the time switch (10) or the space switch (40) (S10, S12, S14). Then, the call is connected by recording the data of the form formatted at step S14 in the idle area of the control memory for which is searched at step S12 (S16).

Thereafter, if it is intended to finish the conversation and disconnect the call, SSDP (20) or SNDP (50), according to a call release request, searches for an idle area of the control memory (15 or 45) provided in the time switch (10) or the space switch (40). SSDP or SNDP then formats the data needed for call release in a form which is appropriate for recording in the control memory (15 or 45) of the time switch (10) or the space switch (40), in order to disconnect the time switch (10) or the space switch (40) (S18, S20, S22). The call is then disconnected by recording the data of the form formatted at step 22 in the idle area of the control memory searched at step S20 (S24).

As described above, SSDP (20) or SNDP (50) which controls the control memory (15 or 45) needed for the call connection, performs simply the function of call connection and release. If a failure occurs at the time switch (10) or the space switch (40) while a call is connected (in other words, if the system clock is unstable or the time switch (10) or the space switch (40) has poor quality), a cut-off call may occur, which could result in an abrupt disconnection of the call.

The switching system of the related art is disadvantageous because it does not perform the function of detecting calls which have been cut-off. The inability to perform this function has caused problems, not the least of which include a deterioration in reliability of the system. These drawbacks have also made repair and maintenance of the system difficult.

SUMMARY OF THE INVENTION

An object of the invention is to solve at least the above problems and/or disadvantages and to provide at least the advantages described hereinafter.

The present invention resolves the above-described problems of the related art and therefore has an object to provide a method of detecting cut-off calls that occur in a time switch or space switch in a switching system. In accordance with at least one embodiment, this is accomplished based on a data value recorded in the control memory of the time switch or the space switch.

More specifically, according to one embodiment of the present invention, a method of detecting cut-off calls in a switching system comprises: recording data needed for call connection in the first memory device according to a call connection request; recording the data needed for call connection in the second memory device; and determining whether a cut-off call has occurred or not according to a call release request by comparing the values recorded in the two memories for identity of the data. The determining step may be accomplished by comparing current connection data corresponding to the call, stored in the first memory device, with the call connection data stored in the second memory device. If the data does not match, it is determined that a cut-off call has occurred, and an operator may then be notified of the occurrence of the cut-off call. The first memory device may be a control memory in a switching device and the second memory device may be an internal memory in a switch control processor.

The step of determining whether a cut-off call has occurred may comprise: reading current data recorded in a location of the first memory device corresponding to the call; comparing the read data with the data recorded in the second memory device at the time of connecting the call, for which the call release has been requested; and, if the two data are not identical, determining that a cut-off call has occurred at the call, for which the call release has been requested.

The step of notifying the operator of the occurrence of the cut-off call comprises: transmitting cut-off call occurrence information that indicates that a cut-off call has occurred at the call for which the call release has been requested to a main processor; and formatting at the main processor the cut-off call occurrence information in a form that may be recognized by the operator and notifying the operator of the cut-off call occurrence with the cut-off occurrence information.

The method of detecting cut-off calls in a switching system according to a preferred embodiment of the present invention further comprises: releasing the call by recording data needed for call release in the first memory device if it is determined that no cut-off call has occurred.

A method of detecting cut-off calls in a switching system according to another preferred embodiment of the present invention comprises: recording data needed for call connection in a control memory within a switching device and an internal memory within a switching control processor according to a call connection request; determining, according to a call release request, whether current data recorded in a location of the control memory corresponding to the call and the call connection data recorded in the internal memory are identical; and if it is determined that the data are not identical, notifying an operator that a cut-off call has occurred.

The step of recording data may include searching for an idle area in the control memory according to a call connection request; formatting the call connection data in a form appropriate for recording in the control memory; connecting the call by recording the formatted data in the searched area of the control memory; and recording the data recorded in the control memory in the internal memory.

The step of determining whether the data are identical may include: searching for an idle area of the control memory according to a call release request; formatting data needed for call release in a form appropriate for recording in the control memory; reading the current data recorded in the control memory; and comparing the read data with the data that was recorded in the internal memory at the time of connecting the call, for which the call release has been requested, and determining whether these data are identical.

The step of notifying the operator may include: determining that a cut-off call occurred at the call for which the call release has been requested if the read data is not identical with the data that was recorded in the internal memory at the time of connecting the call; transmitting to a main processor cut-off call occurrence information according to the result of the determination; and formatting at the main processor the cut-off call occurrence information in a form that may be recognized by the operator and notifying the operator of the cut-off call occurrence with the formatted information.

The method of detecting cut-off calls in a switching system according to another preferred embodiment of the present invention further comprises releasing the call by recording the formatted data needed for call release in the searched area of the control memory according to the call release request if it is determined that the two data are identical.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Hereinafter, a detailed explanation will be given with reference to the attached drawings as to a methods of detecting cut-off calls in a switching system according to the preferred embodiments of the present invention.

First, the structure of a processor for controlling a switching device in a switching system, to which a method of detecting cut-off calls according to the present invention is applied, will be explained.

Figure 1:
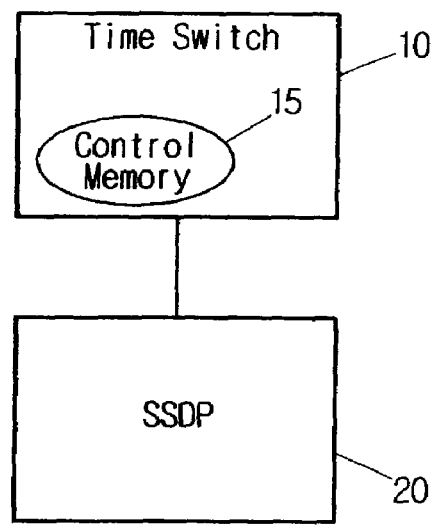
FIG. 1 illustrates the structure of a processor controlling a time switch in the related art.
Figure 2:
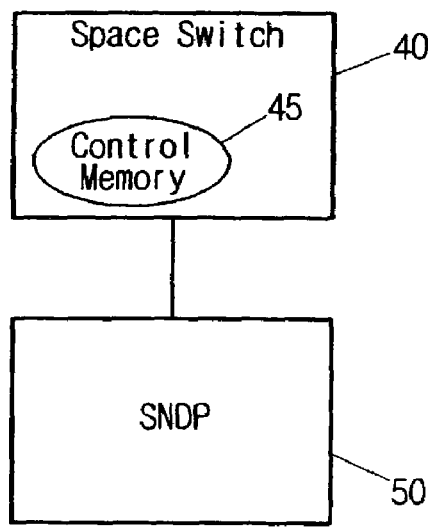
FIG. 2 illustrates the structure of a processor controlling a space switch in the related art.
Figure 3:
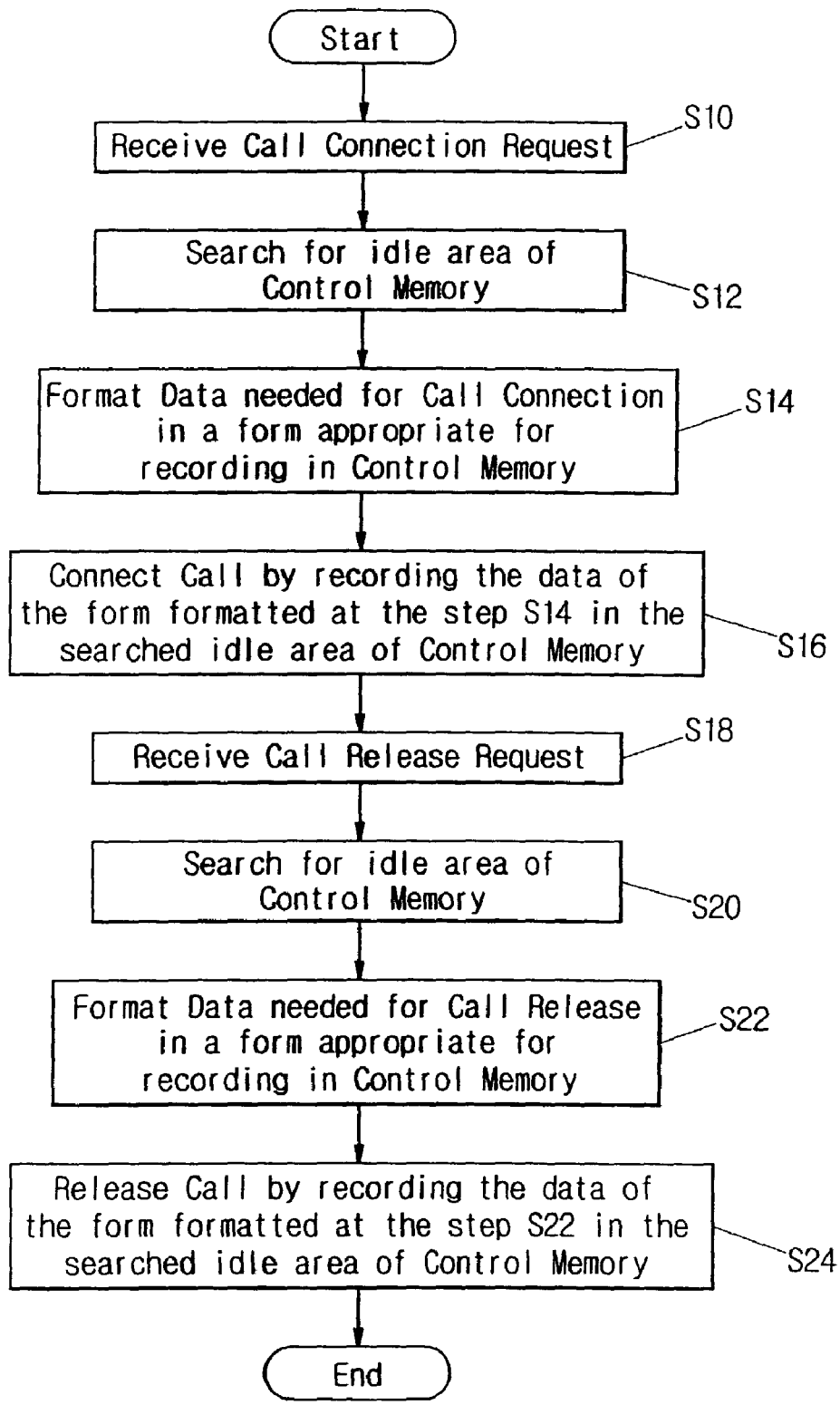
FIG. 3 is a flow chart illustrating call connection and disconnection process of a switching system in the related art.
Figure 4:
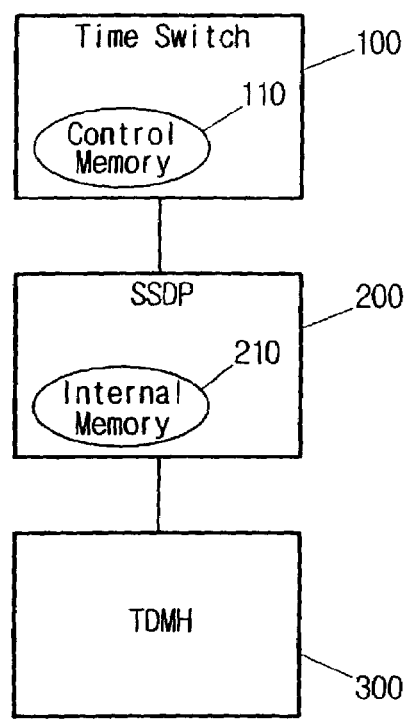
FIG. 4 illustrates the structure of a processor controlling a time switch in a switching system to which a method of detecting cut-off calls according to the present invention is applied.

FIG. 4 illustrates a structure of a processor for controlling a time switch in a switching system to which a method of detecting cut-off calls according to the present invention is applied. The processor includes a SSDP (200) and a TDMH (300). The SSDP (200) that manages a control memory (110) for establishing and releasing connection of a time switch (100), and recognizes whether a cut-off call has occurred or not. The Telephony Device Maintenance Handler (TDMH) (300) receives from SSDP (200) information regarding the occurrence of a cut-off call in time switch (100) and transmits the information to an operator.

Structurally, SSDP (200) preferably includes an internal memory (210) which stores data identical to data needed for call connection or disconnection, which is recorded in the control memory (110) for establishing or releasing connection of the time switch (100).

Figure 5:
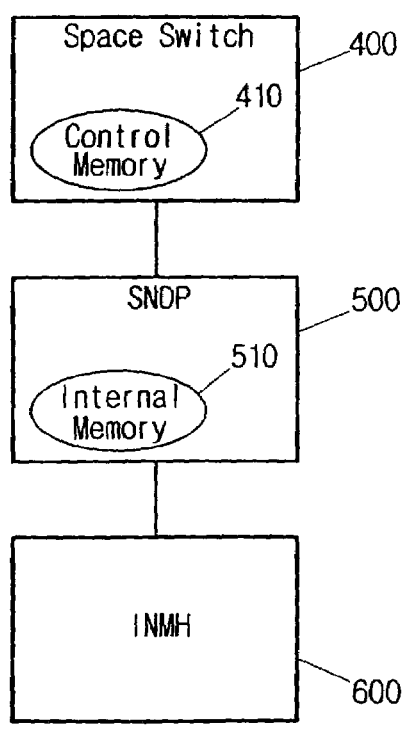
FIG. 5 illustrates the structure of a processor controlling a space switch in a switching system to which a method of detecting cut-off calls according to the present invention is applied.

FIG. 5 illustrates a structure of a processor for controlling a space switch in a switching system to which a method of detecting cut-off calls according to the present invention is applied. The processor comprises: SNDP (500) and an INMH (600). The SNDP manages a control memory (410) for establishing or releasing connection of a space switch (400), and recognizes whether a cut-off call has occurred or not. The Inter Networking Maintenance Handler (INMH) (600) receives from SNDP (500) information regarding the occurrence of a cut-off call at the space switch (400) and transmits the information to an operator.

Structurally, SNDP (500) preferably includes an internal memory (510) which stores data identical to data needed for call connection or disconnection, which is recorded in the control memory (410) for establishing or releasing connection of the space switch (400).

Figure 6:
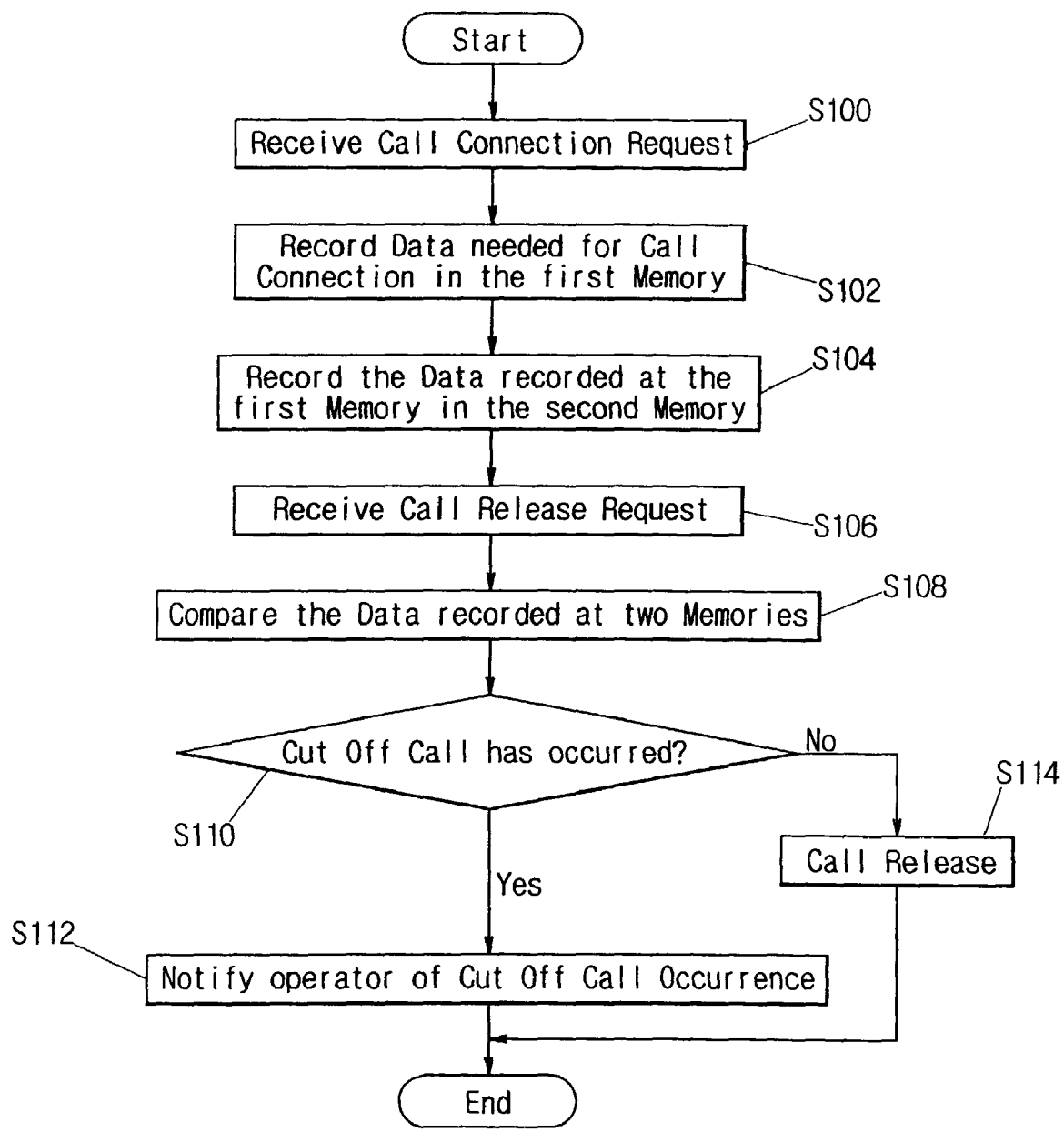
FIG. 6 is a flow chart illustrating a method of detecting cut-off calls in a switching system according to a preferred embodiment of the present invention.

A method of detecting cut-off calls in a switching system according to a preferred embodiment of the present invention will be explained hereinafter with reference to the flow chart of FIG. 6.

First, if call connection is requested, a device processor for controlling the switching device records data needed for call connection in the first memory provided in the switching device (S100, S102). Then, data identical to the data recorded in the first memory is recorded in the second memory separately provided in the device processor (S104).

Thereafter, if a request for release of the call connected through steps S100 to S104 is received, it is determined whether a cut-off call occurred by comparing the data recorded in the first memory through step S102 and the data recorded in the second memory through step S104 (S106, S108, S110). Upon comparison, at step S108, if the that two data are not identical, it is determined that a cut-off call occurred at the call which has received the call release request at step S106. If it is determined at step S110 that a cut-off call occurred, the operator is notified that a cut-off call occurred at the call for which the call release has been requested at step S106 (S112).

On the other hand, if it is determined at step S110 that no cut-off call occurred, the call is released upon recording data needed for call release in the first memory of the switching device (S114).

Figure 7:
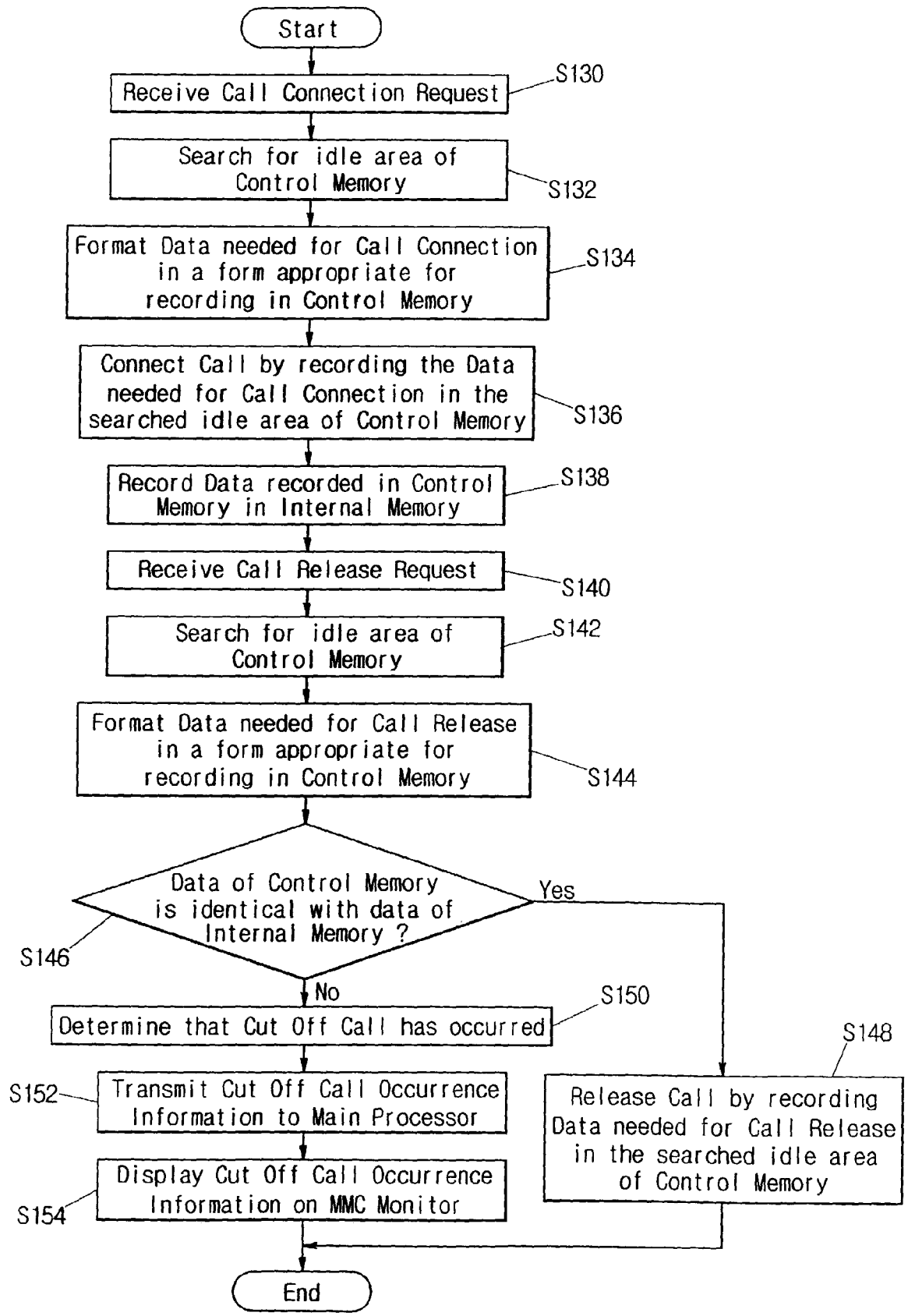
FIG. 7 is a flow chart illustrating a method of detecting cut-off calls in a switching system according to another preferred embodiment of the present invention.

A method of detecting cut-off calls in a switching system according to another preferred embodiment of the present invention will be explained hereinafter with reference to the flow chart of FIG. 7.

First, if call connection is requested, SSDP (200) or SNDP (500) searches for an idle area of the control memory (110 or 410) provided in the switch in order to connect the time switch (100) or the space switch (400) (S130, S132), and then formats data needed for call connection in the form appropriate for recording in the control memory (110 or 410) of the time switch (100) or the space switch (400) (S134).

The data needed for call connection preferably includes control memory address and control memory data. The control memory address may include duplex information that indicates the board of active condition on the duplex switch board, writing/reading information that indicates whether data is to be written in the control memory (110 or 410) or the data recorded in the control memory (110 or 410) is to be read, switching device information that indicates a selected switching device, output channel, and sub-highway information. The control memory data includes busy/idle information that indicates whether the control memory address is to be used (in case of call connection) or not (in case of call release), switching device information that indicates a selected switching device, input channel, and sub-highway information.

Then, the call is connected upon recording data having the form as formatted at step S134 in the idle area of the control memory which was found at step S132 (S136).

Because SSDP (200) or SNDP (500), which has performed call connection at step S136 by controlling the control memory (110 or 410) provided in the time switch (100) or the space switch (400), is able to recognize the value recorded in the control memory (110 or 410) provided in the time switch (100) or the space switch (400), SSDP (200) or SNDP (500) records and stores in the internal memory (210 or 510) provided in SSDP (200) or SNDP (500) the data value which was recorded in the control memory (110 or 410) of the time switch (100) or the space switch (400) (S138).

As previously described, if the time switch (100) or the space switch (400) experiences any disorder while a call is connected, a cut-off call occurs and thus the subscriber cannot be connected because the call has been abruptly disconnected. If such cut-off call occurs, it is expected that the subscriber will retry calling in order for the call to be connected.

In accordance with one embodiment of the invention, "retry calling" means to release an existing call which has been connected and to perform a new call connection. First, SSDP (200) or SNDP (500), upon receiving a call release request for release of the previously connected call, in order to release the connection of the time switch (100) or the space switch (400), searches for an idle area of the control memory (110 or 410) in the time switch (100) or the space switch (400), and then formats data needed for call release in the form appropriate for recording in the control memory (110 or 410) of the time switch (100) or the space switch (400) (S144).

Thereafter, SSDP (200) or SNDP (500) reads the data value recorded, at step S136, in the relevant area of the control memory (110 or 410) in the time switch (100) or the space switch (400) at the time of connecting the call for which the call release has been requested, and determines whether the data value recorded in the relevant area of the control memory (110 or 410) is identical with data value recorded at the step S138 in the relevant area of the internal memory (210 or 510) provided in SSDP (200) or SNDP (500) by comparing the two data values (S146).

If it is determined at step S146 that the data value read from the relevant area of the control memory (110 or 410) in the time switch (100) or the space switch (400) is identical with the data value recorded in the relevant area of the internal memory (210 or 510) provided in SSDP (200) or SNDP (500), the call is released upon recording data having the form as formatted at step S144 in the idle area of the control memory which was searched at step S142 (S148).

On the other hand, upon comparison at step S146, if the data value read from the relevant area of the control memory (110 or 410) in the time switch (100) or the space switch (400) is not identical to the data value recorded in the relevant area of the internal memory (210 or 510) in SSDP (200) or SNDP (500), it is determined that a cut-off call occurred at the call for which call release has been requested at step S140 (S150), and information notifying that a cut-off call occurred at the time switch (100) or the space switch (400) is transmitted to TDMF (300) or INMH (600), which includes a main processor (S152).

At step S150, the occurrence of a cut-off call is determined if the data value read from the relevant area of the control memory (110 or 410) in the time switch (100) or the space switch (400) is not identical with data value recorded in the relevant area of the internal area (210 or 510) in SSDP (200) or SNDP (500), because data value recorded in the relevant area of the control memory (110 or 410) of the time switch (100) or the space switch (400), is changed when the call has been cut-off as a result of, for example, the occurrence of a disorder in the time switch (100) or the space switch (400).

If a cut-off call has occurred, the data value read from the relevant area of the control memory (110 or 410) in the time switch (100) or the space switch (400) is changed and therefore is no longer identical to data value recorded in the relevant area of the internal memory (210 or 510) in SSDP (200) or SNDP (500).

TDMF (300) or INMH (600), which received information that a cut-off call occurred in the time switch (100) or the space switch (400) from SSDP (200) or SNDP (500) at step S152, displays the information received from SSDP (200) or SNDP (500) on a Man Machine Communication (MMC)

monitor by formatting the information in the form that may be recognized by the operator (S154).

The method of detecting cut-off calls in a switching system according to the present invention is not limited to the above-described preferred embodiments and may be implemented with diverse variations within the limit of the technical teachings of the present invention.

According to the method of detecting cut-off calls in a switching system of the present invention as explained above, it is possible to improve reliability of the switching system and to support the repair and maintenance function of the switching system by detecting cut-off calls which occur in the time switch or the space switch using data values recorded in the control memory provided in the time switch or the space switch. Further, it is possible to discover which channel of the time switch or the space switch has the most frequent occurrence of cut-off calls using the statistics on the cut-off call occurrence according to the present invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of detecting cut-off calls in a switching system, comprising:
    recording data corresponding to connection of a call in a first memory device based on a call connection request, said call connection data including control memory address and control memory data for performing the call connection request;
    recording the call connection data in a second memory device;
    determining whether a cut-off call has occurred in response to a call release request, said determining including comparing the call connection data including the control memory address and the control memory data stored in the second memory device with current call connection data including control memory address and control memory data corresponding to the call stored in the first memory device; and
    notifying an operator if a cut-off call has been determined to have occurred.

2. The method of claim 1, wherein the first memory device is a control memory provided in a switch device.

3. The method of claim 1, wherein the second memory device is an internal memory provided in a switch control processor.

4. The method of claim 1, further comprising:
    detecting that the call connection data stored in the first memory has been changed as a result of a cut-off of the call, said changed call connection data corresponding to the current call connection data stored in the first memory device.

5. The method of claim 1, wherein the notifying comprises:
    transmitting cut-off call occurrence information to a main processor, said cut-off call occurrence information indicating that a cut-off call has occurred at the call for which the call release has been requested; and
    formatting the cut-off call occurrence information at the main processor in a form that maybe recognized by the operator, and notifying the operator of the cut-off call occurrence based on the cut-off occurrence information.

6. The method of claim 1, further comprising:
    releasing the call by recording data needed for call release in the first memory device if no cut-off call has occurred.

7. A method of detecting cut-off calls in a switching system, comprising;
    recording data corresponding to connection of a call in a control memory in a switch device and within an internal memory in a switch control processor based on a call connection request, said call connection data including control data for performing the call connection request;
    determining, in response to a call release request, whether current data including control data recorded in a location of the control memory used to store the call connection data at the time of connecting the call is identical to the data including the control data which was recorded in the internal memory of the switch control processor at the time of connecting the call; and
    if the data are not identical, notifying an operator that a cut-off call has occurred.

8. The method of claim 7, wherein the recording includes:
    searching for an idle area in the control memory according to a call connection request;
    formatting the call connection data in a form appropriate for recording in the control memory;
    connecting the call by recording the formatted data in the searched area of the control memory; and
    recording the call connection data recorded in the control memory in the internal memory.

9. The method of claim 7, wherein the determining comprises:
    searching for an idle area of the control memory according to a call release request;
    formatting the call connection in a form appropriate for recording in the control memory;
    reading the data recorded in the location of the control memory used to store the call connection data at the time of connecting the call; and
    comparing the read data with the data recorded in the internal memory of the switch control processor, and determining whether these data are identical.

10. The method of claim 7, wherein the notifying comprises:
    determining that a cut-off call occurred if the current data stored at the location of the control memory used to store the call connection data is not identical to the data recorded in the internal memory at the time of connecting the call;
    transmitting to a main processor cut-off call occurrence information according to a result of the determination; and
    formatting the cut-off call occurrence information at the main processor in a form that maybe recognized by the operator, and notifying the operator of the cut-off call occurrence with the formatted information.

11. The method of claim 7, further comprising:
    releasing the call by recording the formatted data in the searched area of the control memory according to the call release request, if it is determined that the two data are identical.

12. The method of claim 7, wherein the switching device is either a time switch or a space switch.

13. The method of claim 7, wherein the data needed for call connection comprises:
control memory address which includes data writing/reading information, output channel, and sub-highway information; and
control memory data which includes busy/idle information regarding use of the control memory address, input channel, and sub-highway information.

14. A method for detecting cut-off calls in a switching system, comprising:
storing data corresponding to connection of a call in a first memory, said call connection data including control information required for establishing the connection of the call;
detecting a change in said call connection data stored in the first memory; and determining that the call has been cut-off based on said detected change,
wherein said detecting includes:
storing said call connection data in a second memory;
comparing current data including control information stored in the first memory and corresponding to connection of the call with said call connection data including the control information stored in the second memory; and
detecting that a change in said call connection data has occurred based on results of said comparing.

15. The method of claim 14, wherein said storing includes storing said call connection data in a location in the first memory, and wherein said detecting includes detecting whether the current data including the control information stored at said location is the same as said call connection data including the control information.

16. The method of claim 14, wherein the first memory is in a switch device.

17. The method of claim 16, wherein the switch device is a time switch.

18. The method of claim 16, wherein the switch device is space switch.

19. The method of claim 14, wherein the second memory is in a processor which controls the switch device.

20. The method of claim 14, further comprising:
notifying an operator that the call has been cut-off.

21. A system for detecting cut-off calls in a switching system, comprising:
a call switching unit having a first memory, said first memory storing data corresponding to connection of a call, said call connection data including control memory address and control memory data for performing the call connection request; and
a controller which detects a change in said call connection data stored in said first memory, and determines that the call has been cut-off based on said detected change,
wherein the controller stores said call connection data in a second memory, compares current data including control memory address and control memory data stored in said first memory and corresponding to connection of the call with said call connection data including the control memory address and the control memory data stored in the second memory, and detects that a change in said call connection data has occurred based on said comparison.

22. The system of claim 21, wherein said first memory stores said call connection data in a location in the first memory, and wherein the controller detects whether the current data including the control memory address and the control memory data stored at said location is the same as said call connection data including the control memory address and the control memory data.

23. The system of claim 21, wherein the second memory is stored in said controller.

24. The system of claim 21, wherein said first memory is in a switch device.

25. The system of claim 24, wherein the switch device is a time switch.

26. The system of claim 24, wherein the switch device is space switch.

27. The system of claim 21, wherein the controller notifies an operator that the call has been cut-off.

* * * * *